(12) United States Patent
Pan et al.

(10) Patent No.: US 8,473,906 B2
(45) Date of Patent: *Jun. 25, 2013

(54) SYSTEMS AND METHODS FOR PARALLEL DISTRIBUTED PROGRAMMING

(75) Inventors: Lei Pan, Irvine, CA (US); Lubomir R. Bic, Irvine, CA (US); Michael B. Dillencourt, Irvine, CA (US)

(73) Assignee: The Regents of the University of California, Oakland, CA (US)

( * ) Notice: Subject to any disclaimer, the term of this patent is extended or adjusted under 35 U.S.C. 154(b) by 395 days.

This patent is subject to a terminal disclaimer.

(21) Appl. No.: 12/752,919

(22) Filed: Apr. 1, 2010

(65) Prior Publication Data

US 2010/0257337 A1    Oct. 7, 2010

Related U.S. Application Data (63) Continuation of application No. 10/850,842, filed on May 21, 2004, now Pat. No. 7,712,080.

(60) Provisional application No. 60/472,612, filed on May 21, 2003.

(51) Int. Cl.
G06F 9/44 (2006.01)
G06F 9/45 (2006.01)
G06F 15/76 (2006.01)

(52) U.S. Cl.
USPC ........... 717/119; 717/107; 717/108; 717/149; 712/32; 719/312; 719/317

(58) Field of Classification Search
None
See application file for complete search history.

(56) References Cited

U.S. PATENT DOCUMENTS

| | | | |
|---|---|---|---|
| 4,942,517 A * | 7/1990 | Cok | 712/11 |
| 5,333,308 A * | 7/1994 | Ananthanpillai | 714/4.12 |
| 5,551,047 A * | 8/1996 | Mori et al. | 712/28 |
| 5,999,734 A * | 12/1999 | Willis et al. | 717/149 |
| 5,999,987 A * | 12/1999 | O'Farrell et al. | 719/330 |
| 6,122,659 A * | 9/2000 | Olnowich | 709/213 |
| 6,442,663 B1 * | 8/2002 | Sun et al. | 711/202 |
| 6,496,871 B1 * | 12/2002 | Jagannathan et al. | 719/317 |
| 7,036,128 B1 * | 4/2006 | Julia et al. | 719/317 |
| 7,209,248 B1 * | 4/2007 | Govindarajan et al. | 358/1.15 |
| 7,210,145 B2 * | 4/2007 | Srinivasan | 718/100 |
| 7,243,345 B2 * | 7/2007 | Ohsawa et al. | 717/149 |
| 7,475,107 B2 * | 1/2009 | Maconi et al. | 709/202 |
| 7,478,130 B2 * | 1/2009 | Aoki et al. | 709/206 |
| 2003/0014473 A1 * | 1/2003 | Ohsawa et al. | 709/107 |
| 2004/0202165 A1 * | 10/2004 | Aoki et al. | 370/392 |
| 2005/0039159 A1 * | 2/2005 | Pan et al. | 717/100 |
| 2006/0156284 A1 * | 7/2006 | Srinivasan | 717/119 |
| 2012/0017219 A1 * | 1/2012 | Hsieh et al. | 718/104 |

OTHER PUBLICATIONS

Pan et al., Distributed Sequential Computing Using Mobile Code: MOving Computation to Data, published in 2001, IEEE, pp. 77-84.*

(Continued)

*Primary Examiner* — Tuan Q Dam
*Assistant Examiner* — Zheng Wei
(74) *Attorney, Agent, or Firm* — Kenneth S. Roberts; One LLP (57) ABSTRACT

The present invention relates generally to computer programming, and more particularly to, systems and methods for parallel distributed programming. Generally, a parallel distributed program is configured to operate across multiple processors and multiple memories. In one aspect of the invention, a parallel distributed program includes a distributed shared variable located across the multiple memories and distributed programs capable of operating across multiple processors.

25 Claims, 8 Drawing Sheets

OTHER PUBLICATIONS

Wicke et al., Automatic State Capture of Self-Migrating Computations in MESSENGERS, published in 1998, pp. 68-79.*
Fukuda et al., Messeages versus Messengers in distributed Programming, published in 1996, IEEE, pp. 347-354.*
Suzuki et al., Self-Migrating Threads for Multi-Agent Applications, published in 1999 IEEE Computer Society International Workshop on Cluster Computing, pp. 1-8.*
Silva et al., Using MObile Agents for Parallel Processing, published in 1999, pp. 1-9.*
Fukuda et al., Introducing Dynamic Data Structure into Mobile Agents, published in 1999, pp. 1-7.*
Pan et al., Distributed Parallel Computing using Navigatinal programming: Orchestrating Computations Around Data, , IASTED PDCS 2002, pp. 1-6.*
Pan et al., Mobile Agents—The Right Vehicle for Distributed Sequential Computing, Springer-Verlag Berlin Jeidelberg 2002, pp. 575-584.*
Fukuda et al., Messengers: Distributed Programming Using Mobile Agents, Transactions of the SDPS, Dec. 2001, vol. 5, No. 4, p. 95-112.*
Stanislaw Chrobot, Sharing Varaibles in Distributed Memory, Fundamenta Infomaticae 44 (2000) 63-81, IOS Press, pp. 63-81.*
Itzkovitz et al., Thread migration and its applications in distributed shared memory, The journal of systems and software 42 (1998) 71-97.*
Wicke et al., Compiling for Fast State Capture of Mobile Agents, Parallel Computing: Fundamentals & Applications, Proceedings of the International Conference ParCo'99, Aug. 17-20, 1999, pp. 1-8.*
Pan et al., Distributed Sequential computing using mobile code: Moving Computation to Data, IEEE 2001, pp. 77-84.*
Fukuda et al., Messages versus Messengers in Distributed Programming, J. Parallel Distribted Computint 57(2): 188-211 (1999).*
Fukuda, al., Messages versus Messengers in Distributed Programming, published by Journal of Parallel and Distributed Computing vol. 57, Issue 2 May 1999, pp. 1-8.*
Suzuki et al., Self-Migrating Threads for Multi-Agent Applications, publication data: 1999, published by 1st IEEE computer socitiey international workshop, pp. 1-8.*
Lei Pan, et al., *Distributed Sequential Computing* (pp. 223-239), *Applied Parallel and Distributed Computing (Advances in Computation: Theory and Practice*, vol. 16), (Y. Pan and L.T. Yang, Eds.), *Nova Science Publishers, Inc.*, New York, 2004.
Lei Pan, et al., *Facilitating Agent Navigation Using DSM—High Level Designs* (11 pages), The 7th Int'l Conf. on Integrated Design & Process Technology (IDPT03), Austin, Texas, Dec. 2003.
Lei Pan et al., *From Distributed Sequential Computing to Distributed Parallel Computing* (8 pages), The 5th Workshop on High Performance Scientific and Engineering Computing with Applications (HPSECA-03, in conjunction with ICPP-03), Kaohsiung, Taiwan, Oct. 2003.
Lei Pan et al., *NavP Versus SPMD: Two Views of Distributed Computation* (8 pages), Int'l. Conf. on Parallel and Distributed Computing and Systems (PDCS 2003), Marina del Rey, CA, Nov. 2003.
Lei Pan et al., *Distributed Computing Using Navigational Programming* (37 pages), International Journal of Parallel Programming (IJPP), vol. 32, No. 1, pp. 1-37, Feb. 2004, 2004 Plenum Publishing Corporation.
Lei Pan, "*Navigational Programming*", Abstract of the Dissertation, University of California, Irvine (2005), pp. xvii-xx.

* cited by examiner

SYSTEMS AND METHODS FOR PARALLEL DISTRIBUTED PROGRAMMING

CROSS-REFERENCE TO RELATED APPLICATIONS

This application is a continuation of U.S. application Ser. No. 10/850,842 filed May 21, 2004, now U.S. Pat. No. 7,712,080, issued on May 4, 2012, and claims priority to U.S. Application No. 60/472,612 filed on May 21, 2003, which application are incorporated herein by reference.

FIELD OF THE INVENTION

The present invention relates generally to computer programming, and more particularly to systems and methods for parallel distributed programming.

BACKGROUND OF THE INVENTION

Developing a software application for a system with a single processor and a single memory can be straight forward. When viewing the source code for such an application, the source code is often very similar to its original algorithm that describes the computable operations needed to be executed, and thus is generally not too burdensome to follow or analyze given the original algorithm. On the other hand, a software application for operation on multiple processors that uses multiple memory areas may be more complex. Such applications are often referred to as "parallel distributed programs," and there are generally two approaches to developing such programs.

Figure 1A:
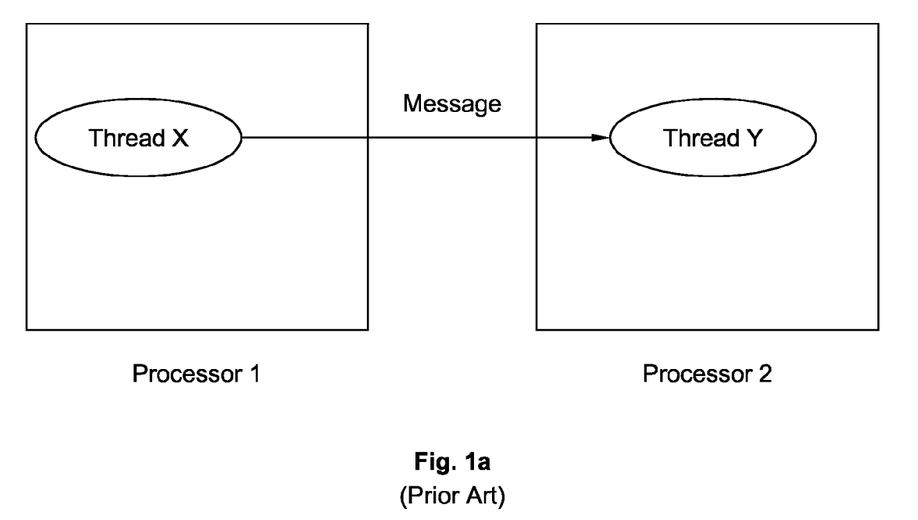
FIG. 1a is an illustration of the prior art operation of message passing.

One approach to developing a parallel distributed program is often referred to as "message passing" ("MP"), which is illustrated in FIG. 1a. With this approach, the system is programmed as multiple tasks or threads, X and Y, that operate or execute on multiple processors, Processors 1 and 2, and handle data residing in multiple memories (not shown). The tasks or threads, X and Y, communicate and cooperate with each other by sending and receiving "messages". This approach allows for the different tasks and threads to operate in parallel and communicate with each other when necessary, which may result in an efficient and high-performing system. However, the source code for such a system may be burdensome to develop because programming the multiple tasks and threads and having them send and receive messages to each other may dramatically change the code structure and data structure of the original algorithm, and hence may be complicated, tedious, and error-prone. The code structure and data structure of the MP-based programs may lose much of their original characteristics. The abilities to preserve these original characteristics are referred to as algorithmic integrity and data structure integrity. MP programs typically do not preserve algorithmic integrity and data structure integrity.

Figure 1B:
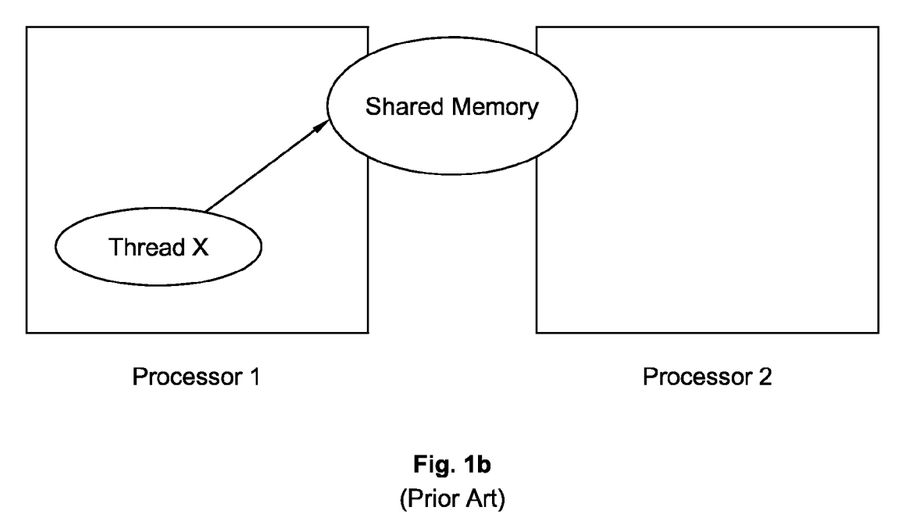
FIG. 1b is an illustration of the prior art operation of distributed share memory.

Another approach is often referred to as "distributed shared memory" ("DSM"), which is illustrated in FIG. 1b. In this approach, a memory space, which may span across multiple memories in different processors, Processors 1 and 2, is dedicated for multiple threads or tasks to access, i.e., it is a globally accessible memory space built on distributed memories. Thus, a thread, X, on one processor, Processor 1, can access data in a memory on another processor, Processor 2, without having to establish another thread. Developing parallel distributed programs using this approach is often easier than using the MP approach, because DSM alleviates the need for major changes in code structure and data structure. However, this approach is generally not as efficient, because it may require a transfer of large amounts of data from the memory on the other processor, Processor 2, to the processor having thread X, Processor 1 and thus may not satisfy the need for high performance parallel computing.

Accordingly, improved systems and methods for parallel distributed programming are desirable.

SUMMARY OF THE INVENTION

The present invention is generally directed to parallel distributed programs. Generally, a parallel distributed program is configured to operate across multiple processors/nodes and multiple memories. In one aspect of the invention, a parallel distributed program includes at least one distributed shared variable located across the multiple memories and one or more distributed programs configured to operate across multiple processors.

In another aspect of the invention, the one or more distributed programs include one or more self-migrating threads configured to migrate from one processor to another.

Other systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE DRAWINGS

A description of the present invention will be rendered by reference to specific embodiments thereof, which are illustrated in the accompanying drawings. It should be noted that the components in the figures are not necessarily to scale, emphasis instead being placed upon illustrating the principles of the invention. Moreover, in the figures, like reference numerals designate corresponding parts throughout the different views. However, like parts do not always have like reference numerals. Moreover, all illustrations are intended to convey concepts, where relative sizes, shapes and other detailed attributes may be illustrated schematically rather than literally or precisely.

DESCRIPTION OF THE PREFERRED EMBODIMENTS

Methods and systems for developing sequential or parallel applications, such as high performance numerical computing, bioinformatics, database, transaction-based, and Internet applications, on distributed memory systems, shared memory systems, and systems that incorporate both distributed and shared memory systems, will now be described. Some examples of the systems are multi-processor supercomputers, clusters, networks of workstations ("NOW"), the Grid, and the Internet.

Figure 2:
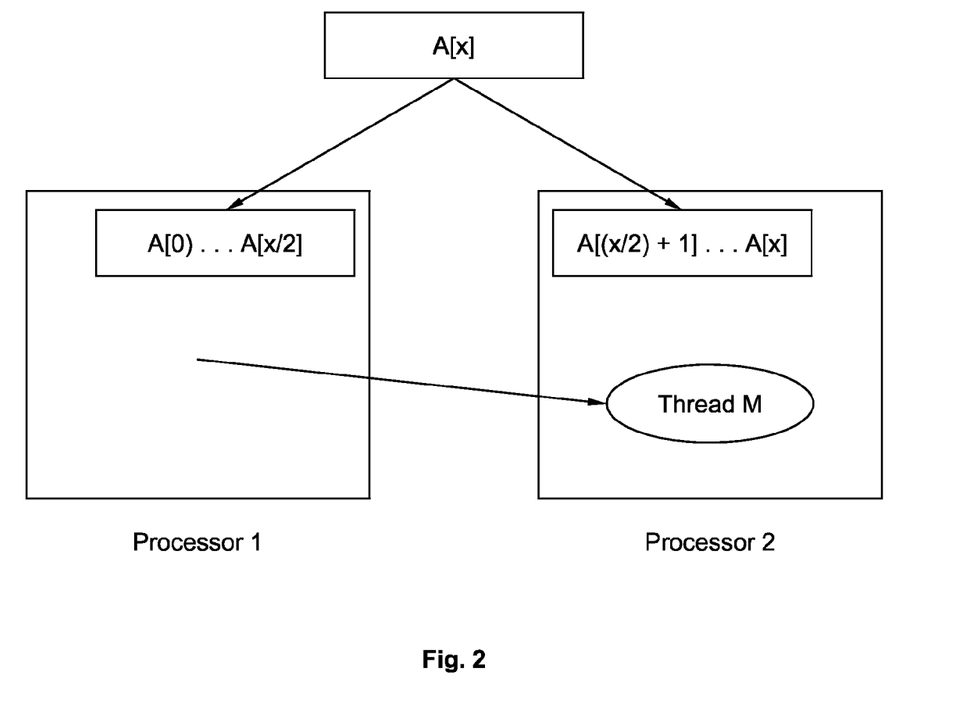
FIG. 2 is an illustration of the operation of a self-migrating thread in accordance with a preferred embodiment of the present invention.

An approach to developing sequential or parallel applications in accordance with a preferred embodiment of the present invention, referred to as "navigational programming," includes the programming and use of self-migrating threads or tasks, which are threads or tasks that can migrate from one processor to another. These self-migrating threads or tasks may be in the form of mobile agents with strong mobility. The approach is illustrated in FIG. 2. These self-migrating threads may be programmed explicitly, e.g., with "migration statements" or implicitly, e.g., driven by data distribution. With this approach, a thread, M, may perform its computations on one processor, Processor 1, and if the thread M needs to access memory belonging to another processor, e.g., Processor 2, it may suspend its computations, migrate, or move, to the other processor, Processor 2, and then resume its computations.

The source code to handle the explicit migration of threads may be in the form of the hop( ) command. The hop( ) commands may be used as annotations in conventional programming languages such as C.

In one aspect of navigational programming, a distributed shared variable ("DSV") may be used. DSVs and self-migration make shared variable programming possible beyond shared memory that provides single-address memory space. A DSV is logically a single variable that includes several variables that may be physically distributed across multiple memories. An example of a DSV is a global array. A global array, A[.], may include x+1 members, i.e., A[0] to A[x]. These members may be variables that are physically distributed across memories of multiple processors, e.g., members A[0] to A[x/2] may be located in the memory of Processor 1 and A[(x/2)+1] to A[x] may be located in the memory of Processor 2. In accordance with navigational programming, a self-migrating thread may access all the entries within the DSV. For example, if thread M is located in Processor 1 and needed to access members A[(x/2)+1] to A[x], thread M would migrate to Processor 2.

Another aspect of navigational programming is distributed sequential computing ("DSC"), which is computing using a single locus of computation over distributed data, possibly stored in a DSV. A self-migrating thread may be utilized to perform DSC. For example, for an algorithm that performs computations on a DSV, e.g., A[.], if the algorithm operates on Processor 1 and needs to access data on Processor 2, a single thread, M, can migrate to Processor 2 to access the data in the memory of Processor 2 and then continue the computations.

DSC allows a programmer to develop threads that efficiently access multiple memories spanning across multiple processors without having to implement the complicated, tedious, time consuming, and error-prone low-level tasks of message handling in distributed programming. Further, it maintains the original code structure and data structure, i.e., it preserves algorithmic integrity and data structure integrity, in the resulting source code. Moreover, the programmer may follow the principle of pivot-computes, which is defined as the principle under which a computation takes place on the node that owns the large-sized data. Thus, if the data is distributed over a plurality of nodes, e.g., multiple memory areas associated with separate processors, wherein the distribution is disproportionate, e.g., a large portion of the data resides in one area and a smaller portion resides in a separate area, the computation will take place on the node with the larger portion of data, i.e., the pivot node, instead of having the larger portion of data moved, which may affect performance. If the programmer follows the principle of pivot-computes, as an MP programmer usually would, then an application utilizing DSC may be as efficient and scalable as an application utilizing the MP approach.

To illustrate this feature, consider a program that sets each member of an array, A[i], to the value of the previous member, and then increments that member by one, wherein i is the number of members of A[.]. For a single processor, single memory system, the pseudo-code may be implemented as follows:

```
(1)      for i = 2 to x
(2)          A[i] = A[i−1] + 1
(3)      end for
```

This program will (1) count from 2 to x, i.e., the number of members of array A, and (2) assign each member i the value of the previous member, i−1, and increment that member by 1. These three code lines may be viewed as a code building block, which may be represented by the following notation $B_T(D)$, where B represents the block of code, T represents the type of computation performed by the block of code (T is for in the above code), and D represents the data that the block of code B operates on (D is the loop index i and the array A[.] in the above code). The block may include any type of basic programming constructs, such as a loop, an if statement, a multi-way conditional statement, or a sequence of assignments. In the above code, A[.] resides in a single memory area.

In parallel distributed computing, the array A[.] is distributed, e.g., the array A[.] spans across multiple memory areas on different processors, P1 and P2, where the first half of the array, A[1 to x/2] is on one processor, P1, and the other half the array, A[(x/2)+1 to x] is on the other processor, P2. A code block required to handle distributed data may be referred to as distributed code building blocks ("DBlocks"). DBlocks cannot be directly taken as implementations in non-shared-memory environments. The essence of implementing distributed memory programs is turning DBlocks into non-DBlocks, defined as "DBlock resolution."

If the prior art Message Passing approach is used to "resolve" the DBlock, then the pseudo-code may be written as follows:

```
(1)     if μ == P1
(2)         for i = 2 to x/2
(3)             A[i] = A[i − 1] + 1
(4)         end for
(5)         t = A[x/2]
(6)         Send (t, P2)
(7)     else if μ == P2
(8)         Recv (t, P1)
(9)         A[1] = t + 1
(10)            for i = 2 to x/2
```

|      |                    |
| ---- | ------------------ |
| (11) | A[i] = A[i − 1] + 1 |
| (12) | end for            |
| (13) | end if             |

This program may run on both processors, and it will (1) check to see if the current processor, μ, on which the task is running, is P1. If it is, then the program will (2) count from 2 to half of the array x/2, which is the portion of the array A[.] in the memory of P1, and (3) assign each member i the value of the previous member, i−1, and increment that member by 1. Then, the program will (5) assign a variable t to the value of the last member of the array A in the memory of P1, x/2. Subsequently, (6) the program will send a message to P2 that will include the value of t. (7) if the current processor, μ, on which the task is running, is P2, then the program will (8) receive a message from P1 containing the value of the last member of the array A[.] on P1 via value t and (9) assign the first member of the array A[.] on P2 to the value in t+1. Then, the program will (10) count from 2 to half of the array x/2, which is the portion of array A[.] in the memory of P2 and (11) assign each member i the value of the previous member, i−1, and increment that member by 1.

Compare the operation of the pseudo-code using the prior art MP technique with the operation of the pseudo-code using navigational programming, as follows:

|     |                |
| --- | -------------- |
| (1) | for i = 2 to x |
| (2) | t = A[i − 1]   |
| (3) | if i == x/2 + 1 |
| (4) | hop (P2)       |
| (5) | A[i] = t + 1   |
| (6) | end for        |

In this program, the task will (1) count from 2 to x, and for each count, the task will (2) assign the value of the member of the previous count i−1 to the variable t. This variable t is referred to as "agent variable," and is accessible by its owner thread from anywhere. (3) If the count reaches one more than half of the array A, then that means the task needs to access the other half of the array A[.] in P2. Thus, the task will (4) "hop" or migrate to P2 and continue its computation. If not, then the task will continue its computation on P1, and (5) assign the value of the previous member and increment it by one. Compared to the implementation done using MP, the DSC program preserves the original code structure (i.e., it does not break the loop into two or more blocks) and the original data structure (i.e., it maintains the global indexing of the array A[.]). DBlock resolution using navigational programming thus preserves the DBlock's code structure and data structure, and the implementation follows the principle of pivot-computes (the pivot node is P1 for the first half of the loop, and P2 for the second).

Another aspect of navigational programming is distributed parallel computing ("DPC"), which is computing using multiple concurrent DSC programs. With this aspect, original code structure and data structure may be preserved by virtue of using DSC programs. The "intersection" between each composing DSC program and the resulting DPC program may be minimal because it may consist of only local synchronizations, which minimizes the code "pollution" among all the composing DSC programs. The composing DSC programs are said to be "orthogonal" to the DPC program, and thus parallel distributed programming using DSC self-migrating threads exhibits "composition orthogonality." Furthermore, a DPC application targeted to multi-processor environments may be utilized on a uni-processor and operates as a multi-threaded application. Since the memory location information is only used in the hop( ) commands used as annotations in the code to indicate migration, ignoring these commands would result in a multi-threaded program that runs on a uni-processor without further changing its code structure and data structure. In contrast, in a program developed using MP, the memory location information is used not only in the Send( ) and Recv( ) commands, but also in restructuring code structure and data structure, therefore such program would look awkward and become unnecessarily difficult to maintain for uni-processors.

To illustrate the feature of DPC, consider a sequential program that performs block-fashion matrix multiplication as follows:

|     |                  |
| --- | ---------------- |
| (1) | for i = 0 to p − 1 |
| (2) | for j = 0 to p − 1 |
| (3) | $C_{ij} = A_i B_j$ |
| (4) | end for          |
| (5) | end for          |

In a distributed environment, we may use a processor to post-fetch the computed C sub-matrix and pre-fetch the next pair of A and B sub-matrices. The DSC program that performs the computation may be written as follows:

|       |                        |
| ----- | ---------------------- |
| (1)   | for i = 0 to p − 1     |
| (2)   | for j = 0 to p − 1     |
| (2.1) | inject (WR (i, j))     |
| (2.2) | waitEvent ($IO_{b(i,j)}$) |
| (3)   | $C_{ij} = A_i B_j$     |
| (3.1) | hop (!μ)               |
| (4)   | end for                |
| (5)   | end for                |

In the program, WR( ) is a separate DSC program that performs fetching. It is "injected," or spawned, by the computing thread, and it hops to the other node to perform fetching, after which it "signals" an event to indicate that the fetching is done. The computing thread will (2.2) wait for the event to make sure that the data is correctly post- and pre-fetched, (3) compute the sub-matrix multiplication, and (3.1) hop to the other node to perform the computation for the next loop. The DSC program WR( ) may be written as follows:

|     |                          |
| --- | ------------------------ |
| (1) | WR(int i, int j)         |
| (2) | hop(!μ)                  |
| (3) | write ($C_{i'j'}$)       |
| (4) | read ($A_{i'}$, $B_{j'}$) |
| (5) | signalEvent ($IO_{b(i',j')}$) |
| (6) | end                      |

The computing DSC program and the fetching DSC program together make a DPC program. The two DSC threads of the DPC program run concurrently to perform parallel or pipelined computing. In this particular example, the computations and the fetching are pipelined.

If the prior art Message Passing approach is used, then the pseudo-code may be written as follows:

```
(1)       if μ == P1
(2)         for i = 0 to p−1
(3)           for j = 0 to p−1
(4)             if (i*p+j)%2 == 0
(5)               Send("f", (i, j), P2)
(6)               C_ij = A_i B_j
(7)             else
(8)               Send("c", (i, j), P2)
(9)               write(C_i'j')
(10)              read(A_i', B_j')
(11)            end if
(12)            Recv(sync, P2)
(13)          end for
(14)        end for
(15)        Send ("stop", (0, 0), P2)
(16)      else if μ == P2
(17)        while (1)
(18)          Recv (s, (i, j), P1)
(19)          if s == "f"
(20)            write(C_i'j')
(21)            read(A_i', B_j')
(22)          else if s == "c"
(23)            C_ij = A_i B_j
(24)          else if s == "stop"
(25)            exit
(26)          end if
(27)          Send(sync, P1)
(28)        end while
(29)      end if
```

In the MP implementation, the code for the two different tasks, namely multiplication and fetching, is tangled, polluting each other. In contrast, the two DSC programs in the navigational programming approach are composed into a DPC program with only local events or injections as the intersection between the two. This demonstrates the composition othogonality of the navigational programming.

Figure 3A:
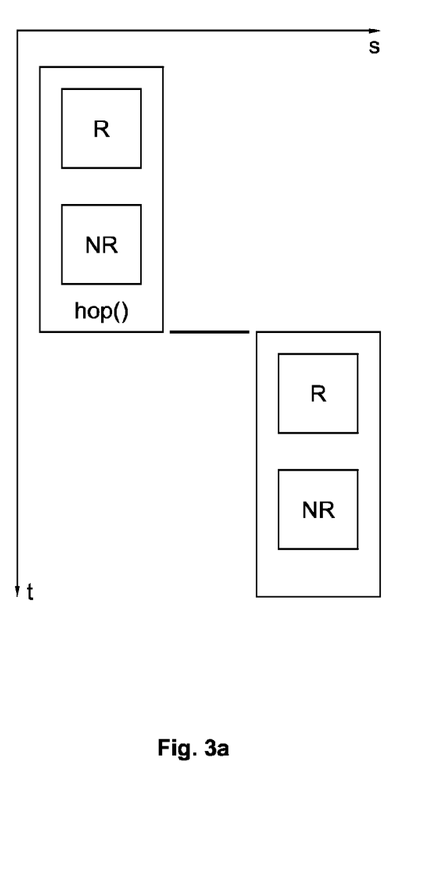
FIGS. 3(a)-(b) is an illustration of one approach to transform a DSC program to a DPC program in accordance with a preferred embodiment of the present invention.
Figure 4A:
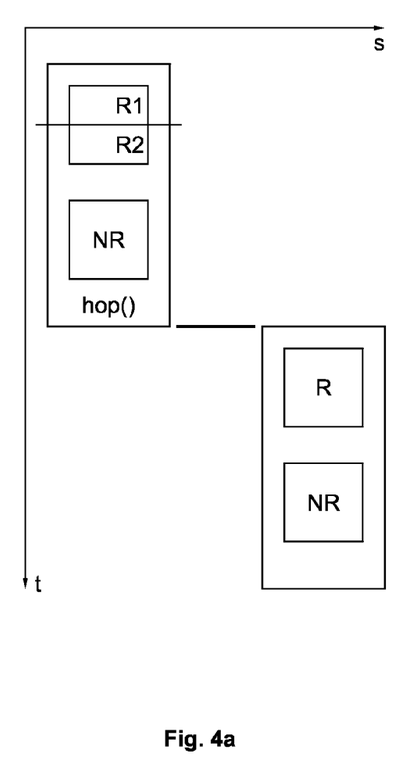
FIGS. 4(a)-(b) is an illustration of another approach to transform a DSC program to a DPC program in accordance with a preferred embodiment of the present invention.
Figure 5A:
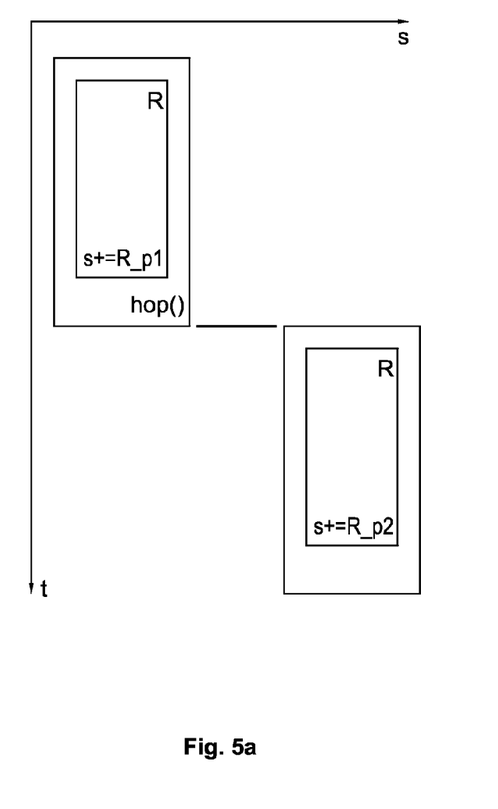
FIGS. 5(a)-(b) is an illustration of another approach to transform a DSC program to a DPC program in accordance with a preferred embodiment of the present invention.

In yet another aspect of the invention, transformations are provided to convert a DSC application into a DPC application utilizing multiple DSC threads running sequentially or concurrently, thus utilizing parallelization and pipeline opportunities in the sequential computation. To illustrate different approaches for transformation, FIGS. 3(a), 4(a), and 5(a) depict sequential computations running in a two-dimensional space with spatial s and temporal t dimensions. These computations may be executing in loops, which means they could continue to spread along both dimensions (only two nodes are shown in FIGS. 3(a), 4(a), and 5(a)). Each box in the figures represents a computation. A box marked with R means the computation represented by the box produces intermediate result that will be required by the following computation on the next node, whereas a box marked with NR means the computation on the next node is independent of the computation represented by the box.

Figure 3B:
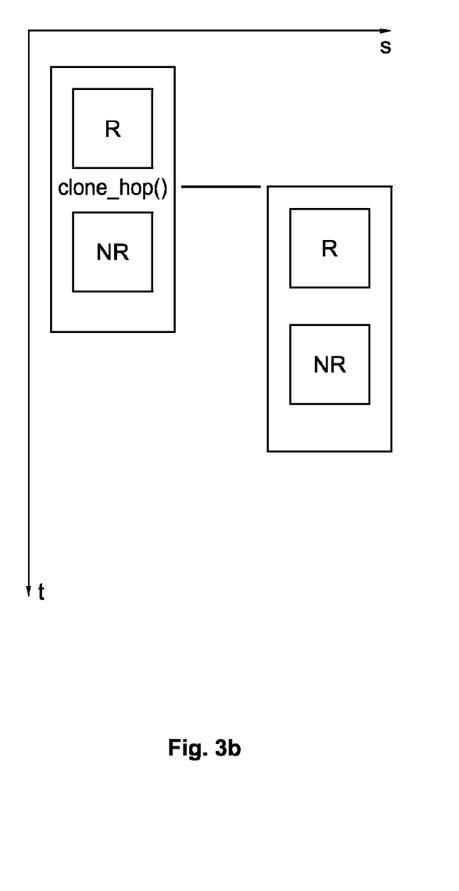

One approach for transformation is illustrated in FIGS. 3(a) and 3(b). In this approach the computation on the next node is scheduled as soon as the dependency condition allows it. That is, since in the DSC the computation on the next node only depends on the intermediate result from part of the computation on the current node, as shown in FIG. 3(a), the thread can clone itself as soon as the computation of R is done, and have the clone hop to the next node carrying the intermediate result and continue the computation at the same time when it continues the computation of NR on the current node, as shown in FIG. 3(b). A special case is when R=Ø in which case the computations on the two nodes are completely independent of each other and can be performed in parallel.

Figure 4B:
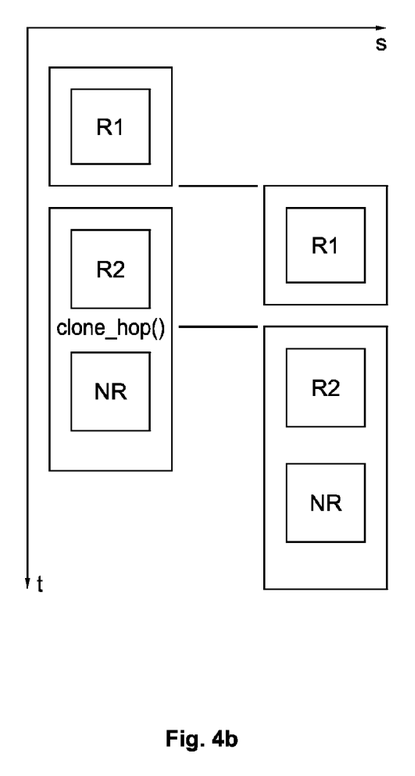

Another approach for transformation is depicted in FIGS. 4(a) and (b). This approach explores pipeline opportunity. The computation of R1 on the next node only depends on the intermediate result from the computation of R1 on the current node, as shown in FIG. 4(a). The thread is split into two. The first thread would, after performing R1 on the current node, hop to the next node carrying the intermediate result and continue the computation of R1 there. The second thread will be transformed using the first transformation, as shown in FIG. 3(b), or using the second transformation recursively (i.e., to split R2 further). The two threads will be synchronized on the next node. That is, upon finishing its computation, the first thread will signal an event to allow the second thread to move on to its computation on the next node.

Figure 5B:
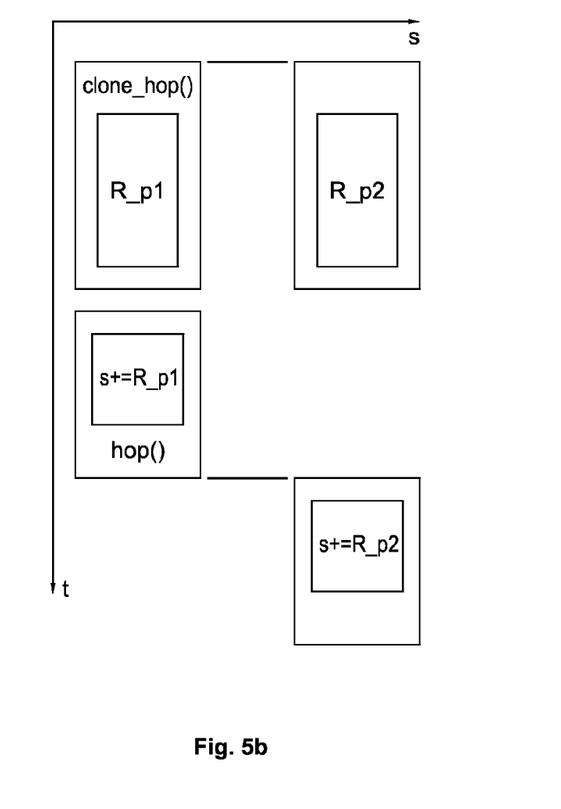

Another approach is illustrated in FIGS. 5(a) and (b). This approach illustrates parallel reduction. The computations on the two nodes each compute a partial result which is added to or multiplied by the total result, as shown in FIG. 5(a). If these computations do not depend on each other, they can be performed in parallel, and the total result can be collected by a separate DSC thread, as shown in FIG. 5(b).

Navigational programming may be facilitated by mobile agent systems. Self-migrating threads may be in the form of mobile agents. Such a mobile agent has the ability to halt its execution, encapsulate the values of its variables, move to another node, restore the state, and continue executing. This ability is often referred to as strong mobility.

There may be several ways of building mobile agent systems. One way is to build directly on top of message passing. An example of such a system is MESSENGERS, in which applications are developed as collections of mobile agents, which may be referred to as Messengers. In MESSENGERS, three levels of networks are used. The lowest level is the physical network (e.g., a LAN or WAN), which constitutes the underlying computational processing elements. Superimposed on the physical layer is the daemon network, where each daemon is a server process that receives, executes, and dispatches Messengers. The logical network is an application-specific computation network created on top of the daemon network. Messengers may be injected by a program, which is part of the MESSENGERS system, or by another Messenger into any of the daemon nodes, and they may start creating new logical nodes and links on the current or any other daemons. Based on application need, multiple logical nodes can be created on one physical node.

A "MESSENGERS daemon" executes compiled Messengers. A daemon and all Messengers running on it share one process, and the Messengers are linked to the process dynamically. Messengers are allowed to call C functions, grouped in a user library which is also dynamically linked to the process. There are four tasks for a daemon. First, to accept signals, such as UNIX signals, to inject Messengers. These signals are sent by the program minject or another messenger. Second, to respond to requests, such as "search node" and "complete link," from other Messengers. Third, to add incoming Messengers to a ready list. And fourth, to execute Messengers. In addition, a daemon also provides a function, the calling of which would result in the autonomous caller Messenger being sent to a destination daemon. Socket-level message passing is used by a daemon or a Messenger to communicate with remote daemons.

Figure 6:
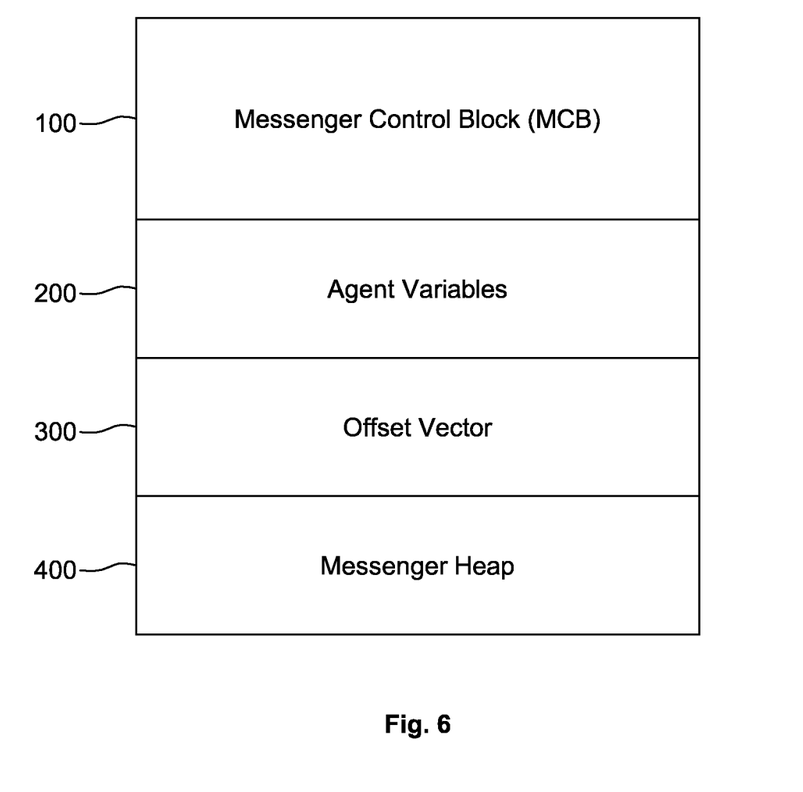
FIG. 6 is an illustration of a Messenger in accordance with a preferred embodiment of the present invention.

The structure of a Messenger is depicted in FIG. 6. A Messenger may include a small Messenger control block ("MCB") 100, which stores data such as "pointer to next function," library name, and Messenger size. The Messenger may further include agent variables 200, a vector of offsets 300 used to access memory in a Messenger heap used for dynamic arrays, and the heap itself 400.

There are two types of variables in MESSENGERS: agent variables and node variables. An agent variable is private to a particular Messenger and travels with that Messenger as it migrates through the logical network. A node variable is stationary and is accessible by all Messengers currently at the logical node to which the variable belongs. Hence agent variables can be used to carry data between nodes, while node variables can be used for inter-agent communication.

A Messenger's programmer may tell it to migrate using the navigational statements, such as hop( ). A destination node's logical address or a logical link between the source and the destination nodes can be used as the argument for the statements. When a Messenger hops, it takes the data in its agent variables with it to wherever it migrates.

A Messenger can spawn another Messenger using a statement, such as inject( ) Synchronization among Messengers uses "events," and statements, such as signalEvent( ) and waitEvent( ). Since no remote data accessing is allowed, the events are local and so is synchronization. A Messenger's execution is not preempted between any two navigational statements. A Messenger must explicitly relinquish control to other Messengers using statements such as hop( ). We call this feature non-preemptive scheduling.

The Messenger compiler lies at the heart of the system. Messengers code, with strong mobility, is translated into stationary code communicating using message passing with sockets. The translated stationary code (in C) is then further compiled into machine native code for execution. Strong mobility in MESSENGERS means that computation migrates in the network in the form of a program counter. The actual mechanism for handling program counters can be seen from a simple example. The basic idea is to break a MESSENGERS program into smaller functions (in C) at navigational or other context-switching statements, and use the "pointer to next function" as an artificial program counter. Consider the following code:

```
(1)     S1
(2)     hop( )
(3)     S2
```

This code shows two statements S1 and S2 separated by a context-switching statement hop( ). This code is compiled by the MESSENGERS compiler into two functions, each takes a pointer to an MCB 100 as its argument, shown in the following code:

```
(1)   f1 (mcb)                        (1) f2 (mcb)
(2)       S1                          (2)     S2
(3)       mcb --> next_func = 2       (3) end
(4)       .../* code for hop ( ) */
(5)   end
```

In this program, f1( ) uses a "pointer to next function" to point to function f2( ) which is executed after migration. Line (4) in the program represents code that calls the daemon function mentioned earlier, and by calling this function the Messenger autonomously sends itself to a destination daemon.

One feature of the MESSENGERS system is that it allows code to either be loaded from a shared disk or, in a non-shared file system, be sent across the network at most once, irrespective of how many times the locus of computation moves across the network. This feature is the key to efficient agent migration.

The overhead of mobile agent navigation in MESSENGERS may be relatively small due to the following reasons. First, since a Messenger is compiled into smaller functions at navigational statements, it is not necessary to save the function stack but only the pointer to next function. Second, the extra information associated with a Messenger's status (i.e., MCB 100) is small. Third, no marshalling and unmarshalling of the agent variables is needed. Fourth, a Messenger runs in the same memory space of a daemon, which is why adding or removing it from the ready list takes only a few instructions to update some pointers in the list, instead of doing memory copying. The navigation of Messengers is almost as fast as sending TCP messages using a C program.

Figure 7:
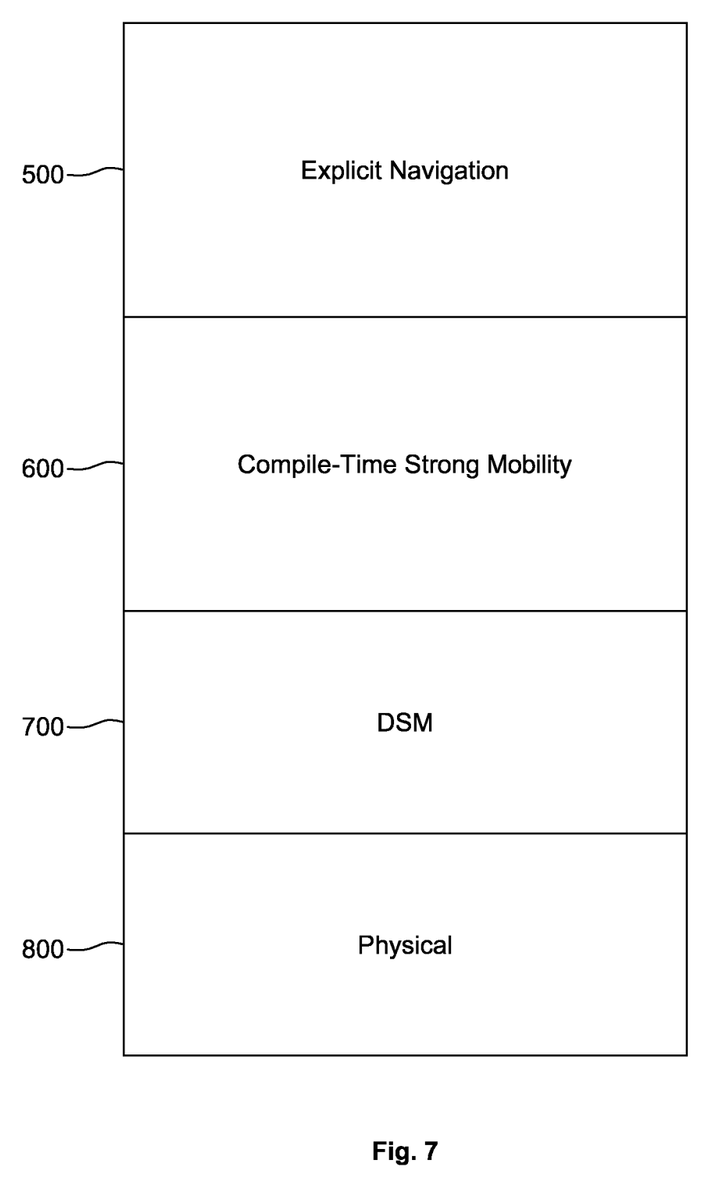
FIG. 7 is an illustration of an explicit-navigation mobile agent system in accordance with a preferred embodiment of the present invention.

In another aspect of navigational programming, an explicit-navigation mobile agent system may be built on top of a DSM. A DSM system may be used to serve as communication media for the globally accessible data, or in other words, agent variables. FIG. 7 depicts the functional components of such a system and the dependencies. A DSM 700 may be built on top of a physical network of machines 800. The mobile agent system 600, which may include a compiler and a daemon system, may be built on the DSM 700. An application may be implemented to include explicit agent navigation 500 that uses the mobile agent system 600. The advantages of such a DSM based explicit-navigation system include: 1) It prevents false sharing; 2) Agent migration is faster using DSM; 3) DSM memory consistency protocols can help to reuse the agent variables when the owner agent visits the same node multiple times; 4) Daemon programming on DSM is dramatically simpler than using socket level message passing programming.

Figure 8:
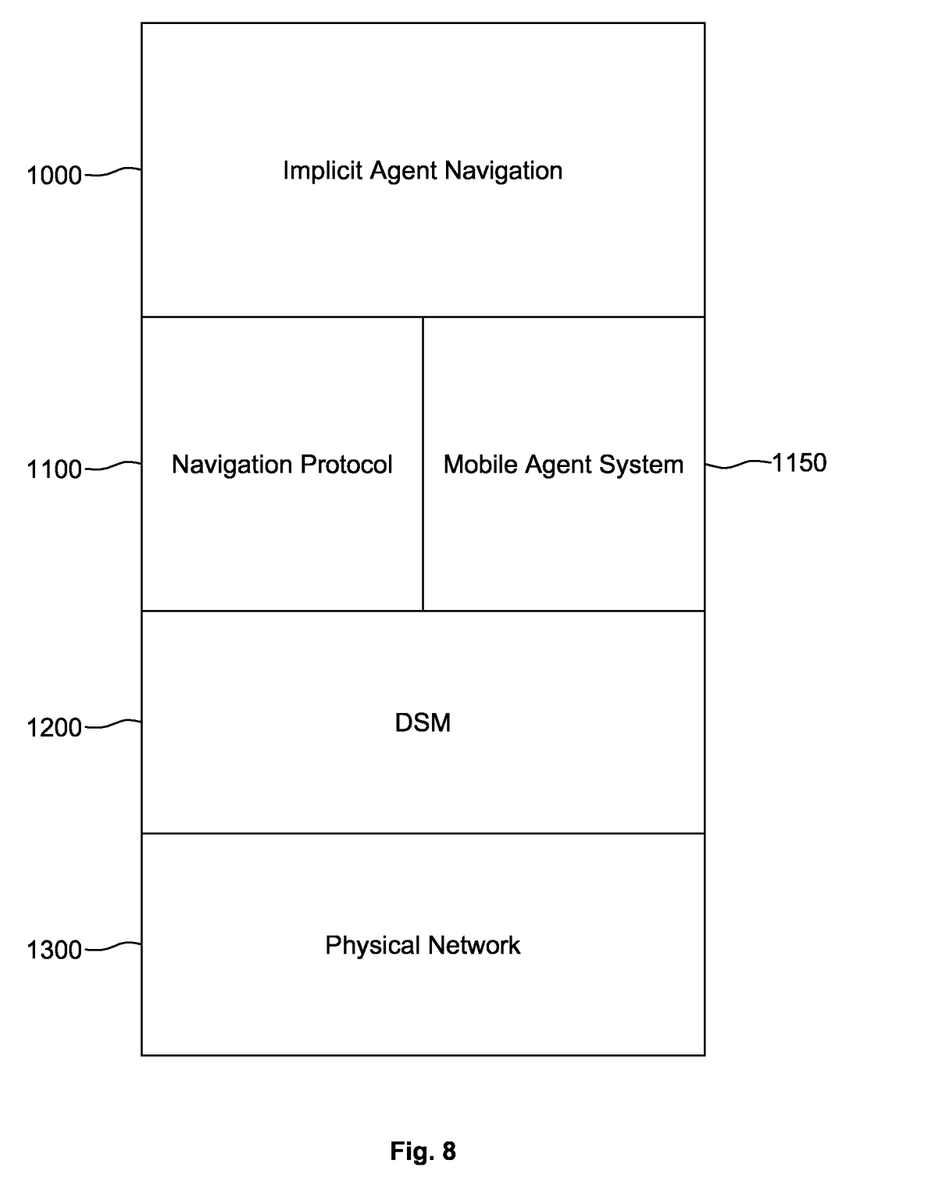
FIG. 8 is an illustration of an implicit navigation mobile agent system in accordance with a preferred embodiment of the present invention.

In another aspect of navigational programming, an implicit-navigation mobile agent system may be based on a DSM. In this system, a mechanism is included that decides for the agent when and where to migrate, and how the migration is achieved. FIG. 8 depicts a functional design of an implicit-navigation agent system. A DSM 1200 may be built on top of a physical network of machines 1300. The design further includes a navigation protocol 1100, which decides when a Messenger migrates and the destination. These protocols 1100 may be designed to follow the principle of pivot-computes. The other component is a mobile agent system 1150 that is able to support run-time strong mobility, i.e., a Messenger should be able to migrate at run-time anywhere in the program without any user direction. An application may be implemented to include implicit agent navigation 1000 that uses the mobile agent system 1150 and navigation protocol 1100. The run-time strong mobility may be used in conjunction with the logical program counter, i.e., the "next function pointer" in MESSENGERS. This may result in more efficient agent navigation combining both the programmer's knowledge of the application and the run-time system's capability in dynamic situations.

In the foregoing specification, the invention has been described with reference to specific embodiments thereof. It will, however, be evident that various modifications and changes may be made thereto without departing from the broader spirit and scope of the invention. For example, the reader is to understand that the specific ordering and combination of process actions shown in the process flow diagrams described herein is merely illustrative, and the invention can be performed using different or additional process actions or a different combination or ordering of process actions. The specification and drawings are, accordingly, to be regarded in an illustrative rather than restrictive sense.

What is claimed is:

1. A computing system, comprising:
one or more memory areas configured to store one or more values corresponding to one or more logically shared variables; and,
one or more processors configured to operate with one or more mobile agents of a computing program, the one or more mobile agents configured to migrate among the one or more processors configured to access the one or more values stored in the one or more memory areas, wherein the computing program includes a configuration to transform into a parallel computing program by forming one or more child computing programs to perform parallel operations, wherein the transform occurs responsive to a determination that at least one intermediate result will be used in execution of at least one of the child computing programs to be formed.

2. The system of claim 1, wherein the logically shared variables are distributed shared variables.

3. The system of claim 1, wherein the computing program and one or more child computing programs are distributed sequential computing programs.

4. The system of claim 1, wherein the parallel computing program is a distributed computing program.

5. The system of claim 1, wherein the one or more mobile agents are configured to be implemented with one or more self-migrating threads.

6. The system of claim 5, wherein the one or more self-migrating threads are configured to move from one processor to another processor.

7. The system of claim 5, wherein the one or more mobile agents are configured to operate within a shared memory system.

8. The system of claim 7, wherein the shared memory system is a distributed shared memory system.

9. The system of claim 1, wherein the one or more mobile agents are explicit-navigation mobile agents.

10. The system of claim 1, wherein the one or more mobile agents are implicit-navigation mobile agents.

11. The system of claim 1, wherein the one or more processors are located across a physical network.

12. The system of claim 1, wherein the distributed sequential computing program is configured to access the one or more logically shared variables.

13. The system of claim 1, wherein the parallel computing program is configured to operate across a distributed shared memory system.

14. The system of claim 1, wherein each of the one or more logically shared variables is a single logical variable that includes several variables that may be physically loaded into the one or more memory areas.

15. A distributed shared memory based system, comprising:
a physical network;
a logically shared variables memory system configured to access the physical network;
a mobile agent system coupled to the logically shared variables memory system; and
one or more processors located across the physical network and configured to operate with a parallel computing program configured to operate across the logically shared variables memory system, the parallel computing program comprising a sequential computing program and at least one child sequential computing programs spawned from the distributed sequential computing program and used concurrently to perform parallel processing and/or operations.

16. The system of claim 15, wherein the mobile agent system includes a configuration that supports compile-time explicit strong mobility.

17. The system of claim 15, wherein the mobile agent system includes a configuration that supports compile-time implicit strong mobility.

18. The system of claim 15, wherein the logically shared variables memory system is a distributed shared memory system.

19. The system of claim 15, wherein the sequential computing program and the at least one sequential computing program are distributed sequential computing programs comprising at least one mobile agent of the mobile agent system.

20. The system of claim 19, wherein the at least one mobile agent is configured to be implemented with self-migrating threads.

21. The system of claim 19, wherein the at least one mobile agent is an explicit-navigation mobile agent.

22. The system of claim 19, wherein the at least one mobile agent is an implicit-navigation mobile agent.

23. The system of claim 19, wherein the at least one mobile agent is configured to move from one processor to another processor.

24. The system of claim 19, wherein the at least one mobile agent operates within the logically shared variables memory system and wherein the logically shared variables memory system is a distributed shared memory system.

25. A computing system, comprising:
one or more memory means for storing one or more values corresponding to one or more logically shared variables; and,
one or more processors means for operating with one or more mobile agents of a computing program, the one or more mobile agents configured to migrate among the one or more processors configured to access the one or more values stored in the one or more memory areas, wherein the computing program includes a configuration to transform into a parallel computing program by forming one or more child computing programs to perform parallel operations, wherein the transform occurs responsive to a determination that at least one intermediate result will be used in execution of at least one of the child computing programs to be formed.

* * * * *